(12) United States Patent
Ahn et al.

(10) Patent No.: US 7,940,357 B2
(45) Date of Patent: May 10, 2011

(54) MULTI VIEW DISPLAY DEVICE AND METHOD OF FABRICATING THEREOF

(75) Inventors: Ji-Young Ahn, Anyang-Si (KR);
Jong-Hoon Woo, Goyang-Si (KR);
Byung-Joo Lee, Gwancheon-Si (KR);
Young-Bok Lee, Goyang-Si (KR);
Hyung-Ju Park, Yongin-Si (KR)

(73) Assignee: LG Display Co., Ltd, Seoul (KR)

( * ) Notice: Subject to any disclaimer, the term of this patent is extended or adjusted under 35 U.S.C. 154(b) by 227 days.

(21) Appl. No.: 12/314,265

(22) Filed: Dec. 5, 2008

(65) Prior Publication Data
US 2009/0147178 A1 Jun. 11, 2009

(30) Foreign Application Priority Data

Dec. 5, 2007 (KR) ................................ 2007-141965
Dec. 31, 2007 (KR) ................................ 2007-125815

(51) Int. Cl.
*G02F 1/1333* (2006.01)
*G02F 1/13* (2006.01)
(52) U.S. Cl. ....................................... 349/111; 349/187

(58) Field of Classification Search .............. 349/110, 349/111, 62, 187; 348/87
See application file for complete search history.

(56) References Cited

U.S. PATENT DOCUMENTS
2007/0064102 A1* 3/2007 Tanaka ............................. 348/87

FOREIGN PATENT DOCUMENTS
GB 2393344 A 3/2004
JP 11-295656 10/1999
* cited by examiner

*Primary Examiner* — Akm E Ullah
(74) *Attorney, Agent, or Firm* — McKenna Long & Aldridge LLP

(57) ABSTRACT

A multi-viewing display device includes a display panel for displaying images; a back light for supplying the light to the display panel; and a viewing converting unit having a plurality of parallax barriers for reflecting the light from the back light and non-reflecting the light from the display panel to control the path of the light in accordance with a desired viewing direction. The viewing converting unit may include a substrate; at least one layer of a parallax barrier made of high reflective material to reflect the light on the substrate; and at least one layer of the parallax barrier made of low reflective material to block the light on the first parallax barriers.

31 Claims, 9 Drawing Sheets

MULTI VIEW DISPLAY DEVICE AND METHOD OF FABRICATING THEREOF

This application claims the benefit of Korean Patent Application No. 141965/2007, filed on Dec. 5, 2007 and Korean Patent Application No. 125815/2007, filed on Dec. 31, 2007, both of which are hereby incorporated by reference for all purposes as if fully set forth herein.

BACKGROUND OF THE INVENTION

1. Field of the Invention

The present invention relates to a multi-view display device, and more particularly to the multi-view display device and a method of fabricating thereof in which the brightness may be improved and cross talk is reduced.

2. Description of the Background Art

Recently, various portable electric devices, such as mobile phones, personal digital assistant (PDA), and notebook computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs and PDPs are currently mass produced because of their simple driving scheme and superior image quality.

These flat panel display devices can be adapted for use in mobile display devices for displaying moving images, such as movies. Further, due to the develop of the high speed information networks, such as the Internet, the mobile display device can display moving images as they are received, such as in real time. Such a mobile display device may receive information through the GPS (Global Position System) device, so that the mobile display device can be used for navigation or location. Thus, the user can watch the information of the user's geographic position and the road, as well as the television program.

The mobile display device may display the favorite movies or video program of the individual and thus be used as a personal display device. When this mobile display device is mounted in an automobile, further, the mobile display device may display a map or other location or navigation information or the images to show the moving images, such as movies or television programs.

As described above, since the display device displays at least two kinds of information, when a plurality of users are in the car each user may demand to display different information. For example, the driver may wish to watch the navigation information and the passenger may wish to watch the movies. Further, when the display device is used as a monitor of a computer, two people may use the display for playing a game, and thus two people may wish to watch an image corresponding to game playing.

This demand can be satisfied by providing the separate two display devices, but two devises require more space and increased price.

In order to solve the space problem and the price problem, a multi-view display device is recently introduced. The multi-view display device displays a plurality of the images in accordance with the viewing direction of the user.

FIGS. 1 and 2 show the multi-view display device.

As illustrated in FIG. 1, the multi-view display device displays three images to the three different viewing directions. As illustrated in FIG. 2, the multi-view display device represents 3 images in accordance with the left, right and center viewing directions. In this 3-view display device, since the 3 images are simultaneously displayed, the number of the pixels for each viewing direction is one-third of the total number of the pixels. Further, in case of the 2-view display device displaying 2-different images, the number of the pixels for one viewing direction of two viewing directions is half of total number of the pixels.

In this multi-view display device, a parallax barrier 20 divides the path of the light from a back light into 3-paths such as right, left, and center paths to display simultaneously 3-different images to each path. As a result, the user in the central path can, for example, watch the television program, the user in the left path can play the game, and the user in the right path can access the Internet.

FIG. 3 illustrates the structure of the related art multi-view display device.

As illustrated in FIG. 3, the related art multi-view display device includes a liquid crystal display panel 1 and a viewing converting unit 2 having the parallax barrier 20.

The liquid crystal display panel 1 includes a color filter substrate 5, an array substrate 12, and a liquid crystal layer (not shown) between the color filter substrate 5 and the array substrate 12. The color filter substrate 5 includes a color filter 7 having R (Red), G (Green), B (Blue) sub-pixels for representing the red, green, and blue colors, a black matrix 6 between the color filters 7 to block the light through the liquid crystal layer, and a transparent common electrode (not shown) for applying the voltage to the liquid crystal layer.

The color filter 7 includes a first color 7C for the center view, a second color filter 7L for the left view, and a third color filter 7R for the right view.

The color filter substrate 5 and the array substrate 12 are attached by a sealant (not shown) at the outer edge of the image displaying region to form the liquid crystal display panel 1. At the outside of the viewing converting unit 2 and the array substrate 1, linear polarizing plates 9 and 10 are respectively attached. The linear polarizing plates 9 and 10 selectively transmit the light oscillating in one direction through the liquid crystal layer to display images.

The back light is disposed at the rear side of the liquid crystal display panel 1. The back light includes a light guide plate 40, at least one lamp 30 at the side of the light guide plate 40, a reflecting plate (not shown) at the rear side of the light guide plate 40, and a plurality of optical sheets 45 above the light guide plate 40 for scattering the light to supply the uniform light to the liquid crystal layer.

The view converting unit 2 includes a substrate 21 and a plurality of parallax barriers 20 on the substrate 21. The parallax barriers 20 are spaced each other to form a slit structure.

The substrate 21 including parallax barrier 20 is attached to the color filter substrate 5 by an adhesive material 22. The parallax barrier 20 is made of a black resin or a metal.

In this multi-view display device, when the light from the back light is incident to the parallax barrier 20, as indicated by a arrow of a solid line in drawing, the light is absorbed by the parallax barrier 20 or reflected from the parallax barrier 20 which cause the deterioration of the brightness. For example, it is well known that the brightness for center viewing direction is decrease when the parallax is made of the black resin.

SUMMARY OF THE INVENTION

Accordingly, the present invention is directed to multi-viewing display device and a method of fabricating thereof that substantially obviates one or more of the problems due to limitations and disadvantages of the related art.

An advantage of the present invention is to provide a multi-view display device capable of providing increased light to the viewer.

Another advantage of the present invention is to provide an improved manufacturing method for a multi-view display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The multi-viewing display device according to one aspect of this invention comprises a display panel for displaying images; a back light for supplying the light to the display panel; and a viewing converting unit having a plurality of parallax barriers for reflecting the light from the back light and non-reflecting the light from the display panel to control the path of the light to display the different in accordance with the viewing direction, the viewing converting unit including: a substrate; at least one first parallax barrier made of high reflective material to reflect the light on the substrate; and at least one second parallax barrier made of low reflective material to absorb the light on the first parallax barriers.

The first parallax barrier is made of a metal selected from the group consisting of Al, Al alloy, and Mo and the second parallax barrier is made of a black resin, CrOx, or CrNy.

The method of fabricating this multi-viewing display device according to this invention comprises providing a liquid crystal display panel; providing a substrate; forming a metal layer on the substrate; forming a black resin layer on the metal layer; developing the black resin layer using a mask to form at least one second parallax barrier; etching the metal layer using the second parallax barrier as a mask to form at least one first parallax barrier under the second parallax barrier; and attaching the substrate having the first and second parallax barriers to the liquid crystal display panel.

The multi-viewing display device according to other aspect of this invention comprises a display panel for displaying images; a back light for supplying the light to the display panel; and a viewing converting unit having a plurality of parallax barriers for reflecting the light from the back light and retroreflecting the light from the display panel to control the path of the light to display the different images in accordance with the viewing direction, the viewing converting unit including a substrate, at least one first parallax barrier made of high reflective material to reflect the light on the substrate, and at least one second parallax barrier on the first parallax barrier, the second parallax barrier being made of retroreflection material to retroreflect the light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
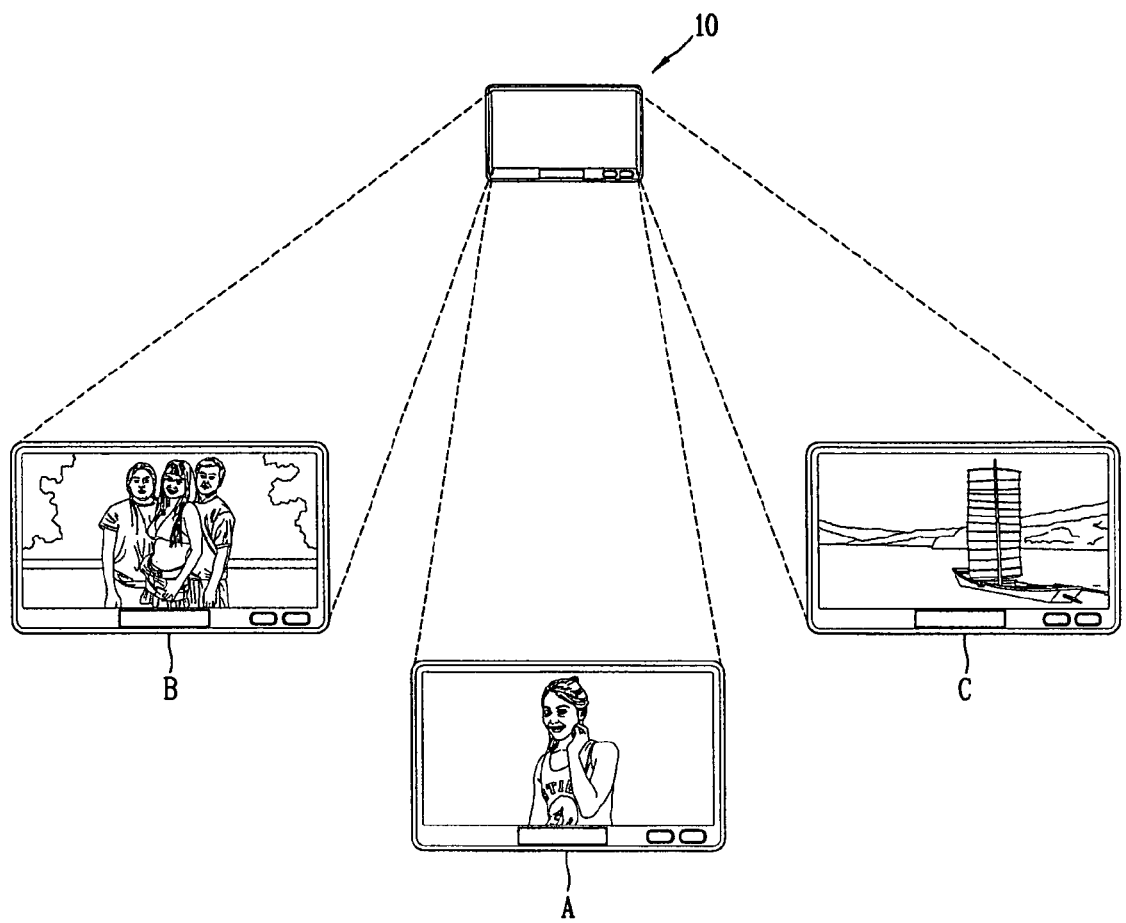
FIG. 1 is a view illustrating the multi-viewing display device having 3-different images in the 3 viewing directions.
Figure 2:
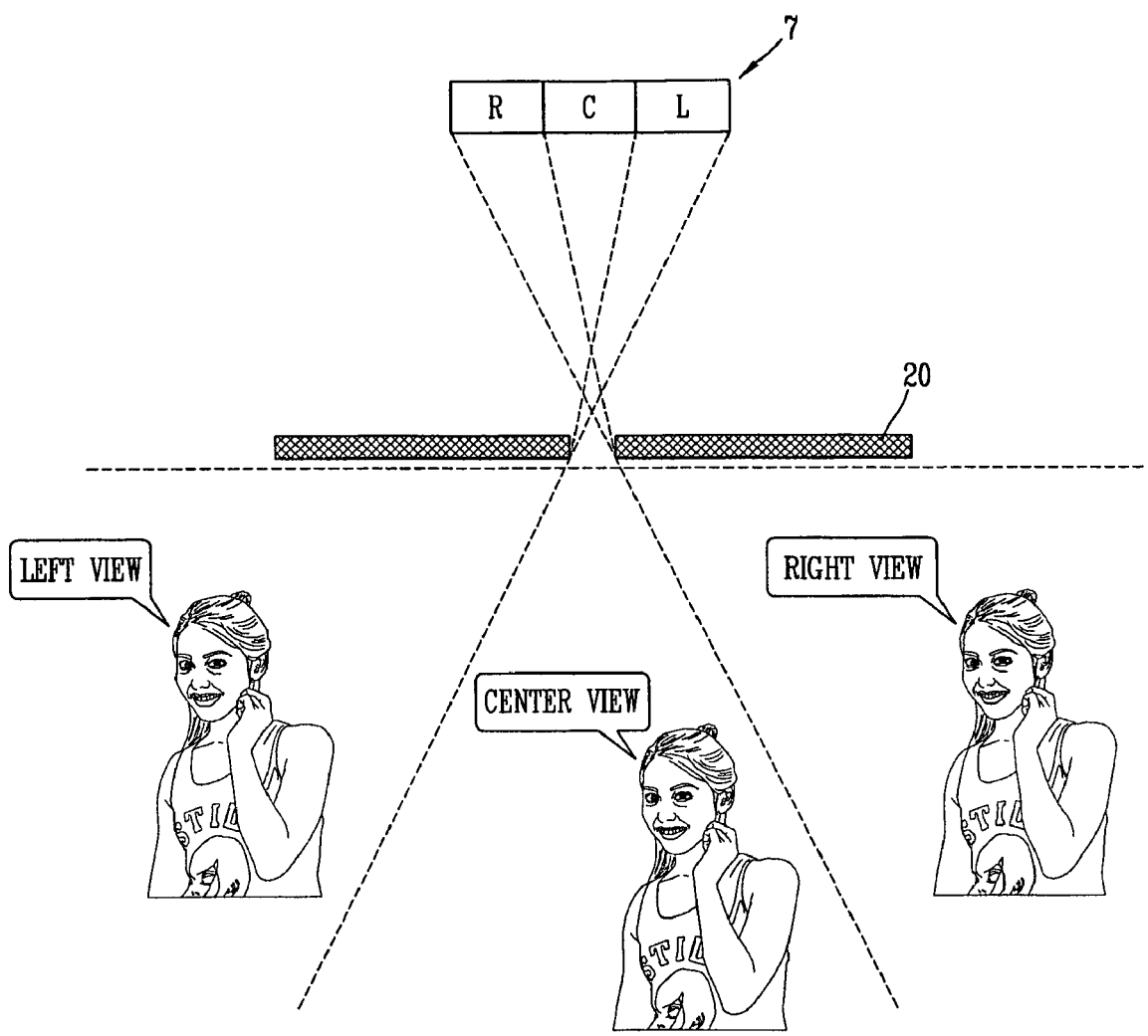
FIG. 2 is a view illustrating the multi-viewing display device of the this invention.
Figure 3:
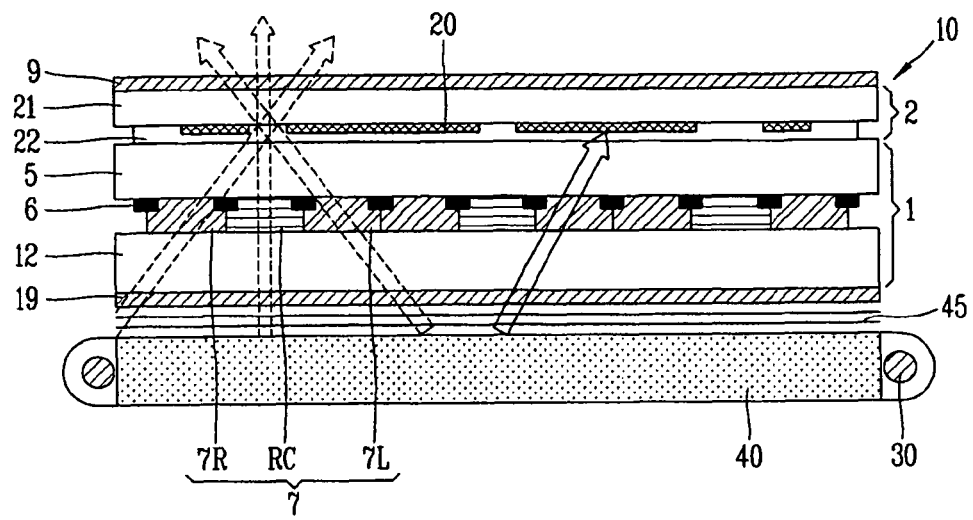
FIG. 3 is a view illustrating the structure of the multi-viewing display device of the related art.
Figure 4:
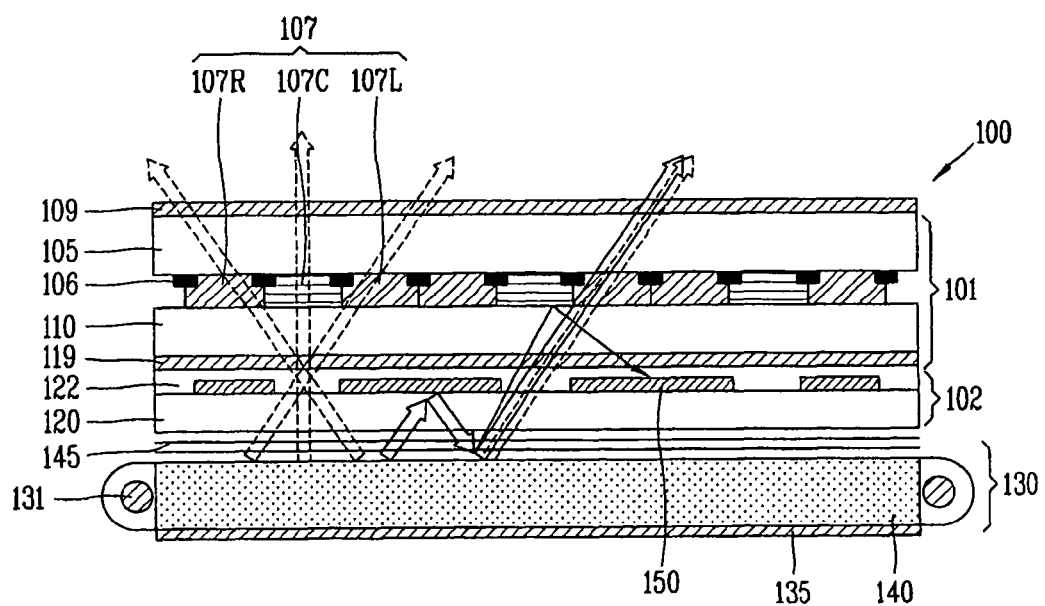
FIG. 4 is a view illustrating the structure of the multi-viewing display device according to a first embodiment of this invention.

FIG. 4 is a view illustrating the multi-view display device according to first embodiment of this invention. In this drawing, only a 3-view display device in which different images are displayed in three different viewing directions is described. However, this invention is not limited this particular structure of 3-view display device. That is, this invention may adapted to the various structures of the multi-view display device such as a 2-view display device and 4-view display device, etc., as may be appreciated by one of skill in the art.

As illustrated in FIG. 4, a multi-view display device 100 includes a liquid crystal display panel 101 a back light 130 at the rear side of the liquid crystal display panel 101 to supply the light thereto, a viewing converting unit 102 between the liquid crystal display panel 101 and the back light 130. The viewing converting unit 102 may form a plurality of paths for light from the back light 130 to the liquid crystal display panel 101.

Figure 5:
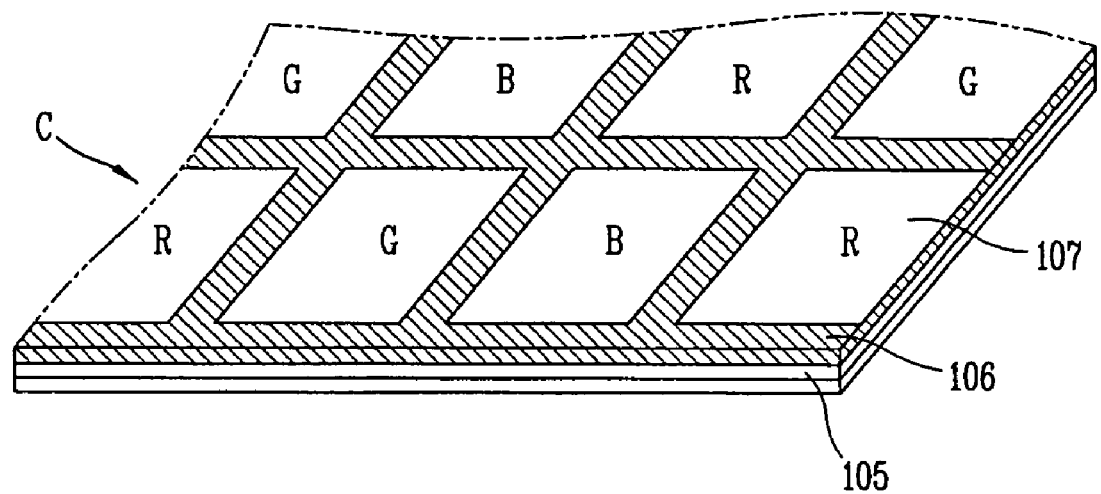
FIG. 5 is a view illustrating the structure of the liquid crystal display panel of the first embodiment.
Figure 5:
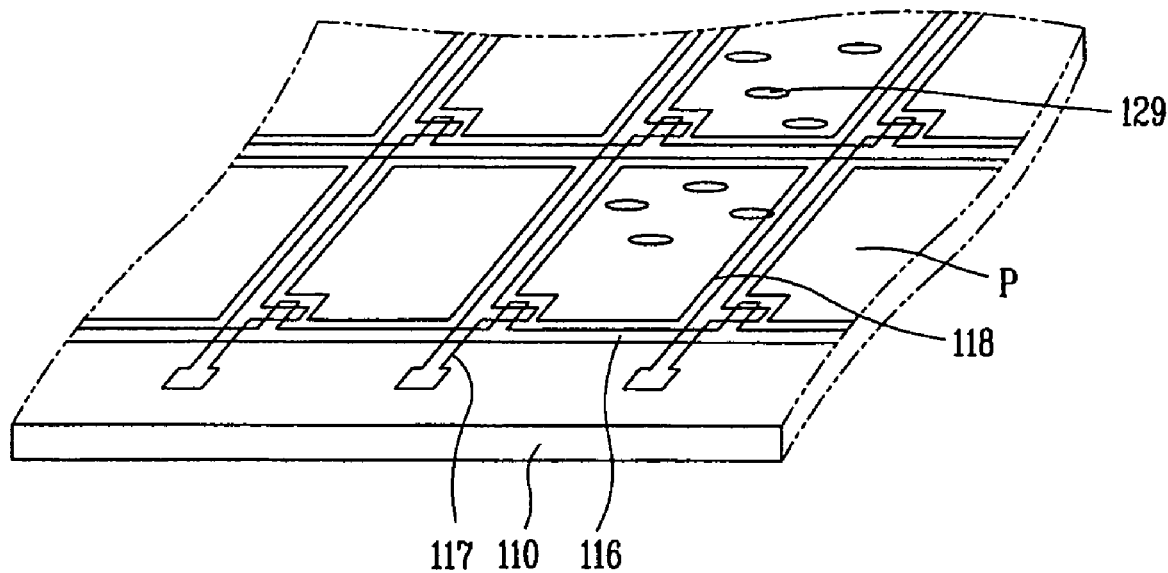

As illustrated in FIG. 5, the liquid crystal display panel 101 includes a color filter substrate 105, an array substrate 110, and a liquid crystal layer 129 between the color filter substrate 105 and the array substrate 110. The array substrate 110 includes a plurality of gate lines 116 and data lines 117 substantially perpendicular to each other to define a plurality of pixel regions, a thin film transistor T at each pixel region to be driven by the scan signal through the gate line 116 from an external driver, a pixel electrode P at each pixel region for representing image by inputting the image signal through the data line 117 when the thin film transistor T is driven.

The color filter substrate 105 includes color filters 107 having a plurality of R, G, B colors, the black matrix 106 between the color filters 107 to block the light passing through a non-display region, a common electrode (not shown) over the color filters 107 and the black matrix 106 to form an electric field in the liquid crystal layer 129 when the voltage is supplied to the pixel electrode.

As illustrated in FIG. 4, the color filters 107 includes a first color filter 107C for the center view, a second color filter 107L for the left view, and a third color filter 107R for the right view.

The array substrate 110 and the color filter substrate 105 are attached by a sealant (not shown) at the outer edge of an image display region to form the liquid crystal display panel 101. Linear polarizing plates 109 and 119 may be respectively disposed to the outside of the array substrate 110 and the color filter substrate 105. Further, the linear polarizing plate 119 may be disposed between the viewing converting unit 102 and the back light 130.

The viewing converting unit 102 may be disposed at the rear side of the liquid crystal display panel 101. The viewing converting unit 102 divides the path of the light into a plurality of paths and then supplies the light to the liquid crystal display panel 101 through the divided paths, so that a plurality of images in the liquid crystal display panel 101 are displayed through the divided paths and users can watch different images in accordance with the position of the user. At this time, a plurality of parallax barriers 150 are formed in the viewing converting unit 102 to divide the path of the light to be supplied to the liquid crystal display panel 101 into a plurality of paths.

Figure 6A:
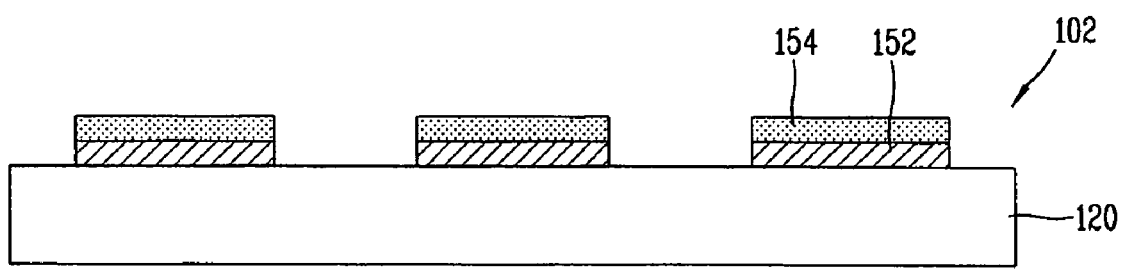
FIGS. 6A and 6B are views illustrating the structure of the viewing converting unit of the first embodiment.

As illustrated in FIG. 6A, the viewing converting unit 102 includes the substrate 120 made of the transparent material such as a glass, a parallax barrier on the substrate 120, and the parallax barrier having a first layer 152 and a second layer 154 the first layer 152. The first layer 152 may be a reflective layer and the second layer may be a light blocking layer. Further, the reflective layer may be highly reflective and the light blocking layer may cause the light not to transmit through the parallax barriers. The viewing converting unit 102 transmits a part of the light from the back light 130 and blocks a part of the light to divide the path of the light to the liquid crystal display panel 101 into a plurality of the paths. At this time, the first layer 152 may be made of high reflective material, for example Aluminum, an Aluminum alloy (such as AlNd), Molybdenum or Copper to reflect the light from the back light 130. The second layer 154 may be made of low reflective material, for example a metal having low reflectance such as CrOx and CrNy and an organic material such as black resin so as not to reflect the light or cause light to pass through the parallax barrier. In case where an organic material such as the black resin is used as the second layer barrier 154, a passivation layer such as OC, SiNx or ITO layer may be formed on the second parallax barrier 154.

The first layer 152 can be formed in a plurality of layers such as AlNd/Mo. Further, when the second layer 154 is made of the metal, this second layer 154 can be formed in a plurality of layers such as CrOx/CrNy and CrOx/CrNy/Cr.

Figure 6B:
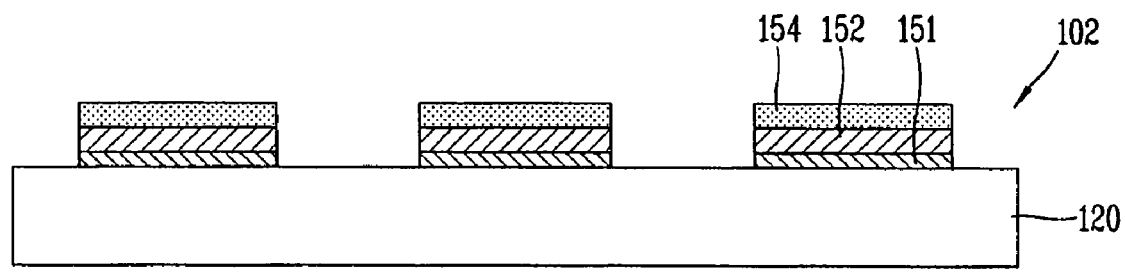

As illustrated in FIG. 6B, an intermediate layer 151 may be formed between the substrate 120 and the first layer 152 to attach the first layer 152 to the substrate 120. When the first layer 152 is made of Cu, the intermediate layer 151 may be made of Mo or MoTi. When the first layer 152 is made of Al, Al alloy, and Mo, the intermediate layer 151 may be made of ITO (Indium Tin Oxide) or IZO (Indium Zinc Oxide).

The viewing converting unit 102 may be divided into a transmit portion and a block portion by the parallax barrier, so that part of the light is transmitted through the transmit portion and part of the light is blocked by the block portion, thereby the path of the light is divided into a plurality of paths. The width of the transmit portion and the block portion, that is, the width of the parallax barriers and the interval between the parallax barriers may be determined by the interval between the viewing converting unit 102 and the liquid crystal display panel 101, the viewing angle to the multi-view, and the number of the multi-view.

The back light 130 is disposed at the rear side of the viewing converting unit 102 to supply the light to the liquid crystal display panel 101. The back light 130 includes a plurality of lamps for emitting light, a light guide plate 140 at the rear side of the viewing converting unit 102 to guide the light from the lamps 131 to the liquid crystal display panel 101, a plurality of optical sheets 145 between the viewing converting unit 102 and the light guide plate 140 to scatter the light which is guided by the light guide plate 140 for supplying the uniform light to the liquid crystal display panel 101, and a reflecting plate 135 at the rear side of the light guide plate 140 to reflect the light to the liquid crystal display panel 101.

Although only the edge type back light in which the lamp 130 is disposed at the side of the back light is disclosed in the drawing, the back light of this invention is not limited the edge type back light. This invention may be adapted to the various type back light. For example, a direct type back light may be useful as the back light of large size liquid crystal display device according to this invention.

In this multi-view display device, when the scan signal is applied to the thin film transistor T of the liquid crystal display panel 101 through the gate line 116 from the outer driver, the thin film transistor T is turned on and then the image signal is supplied to the pixel electrode P through the data line 117 from the outer driver to apply the electric field to the liquid crystal layer 129. When the electric field is applied to the liquid crystal layer 129, the liquid crystal molecules are arranged along the electric field and thus the transmittance through the liquid crystal layer 129 can be controlled.

The parallax barriers 150 of the viewing converting unit 102 divide the path of the light into a plurality of paths and the light is supplied to the liquid crystal display panel 101 through the divided several paths. Thus, images are also displayed through a plurality of paths in the liquid crystal display panel 101. That is, a plurality of images are simultaneously displayed in the predetermined regions so that a plurality of users can watch the desired images simultaneously.

As illustrated in FIGS. 4, 6A, and 6B, the first layer 152 of the parallax barrier of the viewing converting unit 102 is made of the metal having good reflectivity. Thus, the light incident to the first layer 152 from the back light 130 is reflected by the first layer 152. Then the reflected light is again reflected at the reflecting plate 135 of the back light 130 and then supplied to the liquid crystal display panel 101 through the transmit portion of the viewing converting unit 102. At this time the reflected light at the first parallax barrier 152 is supplied to the liquid crystal display panel 101 through above process.

In the related multi-view display device, the viewing converting unit is disposed at the front side of the liquid crystal display panel so that the path of the light through the liquid crystal display panel is divided into a plurality of paths by the viewing converting unit to display a plurality of images. Thus, since the light blocked by the parallax barrier of the viewing converting unit is not supplied to the liquid crystal display panel, the brightness of the related multi-view display device may be deteriorated.

In this invention, however, since the viewing converting unit 102 is disposed between the liquid crystal display panel 101 and the back light 130 and the first layer of the parallax barrier of the viewing converting unit 102 is made of the metal having good reflectivity, the light blocked by the first layer 152 is reflected by the reflecting plate 135 of the back light 103 and then supplied to the liquid crystal display panel 101.

Thus, the brightness of the multi-view display device according to this invention can be improved. For example, comparing with the related multi-view display device, the brightness of this invention can be improved by more than about 45%.

As illustrated in FIGS. 6A and 6B, the second layer 154 on the first layer 152 may be made of the organic material having lower reflectivity such as the black resin or a metal having lower reflectivity.

In general, various metal patterns such as the gate line 116 and the data line 117 are formed in the liquid crystal display panel 101. Thus, the light supplied to the liquid crystal display panel 101 through the transmit portion of the viewing converting unit 102 is reflected by the metal patterns and the reflected light is again incident to the viewing converting unit 102. If the second layer 154 of the parallax barrier is made of the metal having good reflectivity, light incident to the viewing converting unit 102 is again reflected by the second layer 154 of the parallax barrier and then supplied to the liquid crystal display panel 101. Since the light reflected by the second layer 154 is supplied to the liquid crystal display panel 101 along a mis-set path, e.g., not the determined path such as center, left, and right viewing path, the light may produce noise that causes cross talk in the liquid crystal display panel 101.

However, since the second layer 154 of the parallax barrier is made of black resin or metal of low reflectivity, the light reflected in the liquid crystal display panel 101 is not reflected at the second layer 154 of the parallax barrier and is not supplied to the liquid crystal display panel 101, so that the cross talk can be reduced.

In other words, since the parallax barrier 150 is made of the high reflectivity material and low reflectivity material, the light is sufficiently supplied to the liquid crystal display panel 101 from the back light 130 to improve the brightness thereof and the light reflected by the liquid crystal display panel 101 is not supplied thereto to reduce cross talk.

The first layer 152 of the parallax barrier can be made of the various material reflecting the incident light to improve the efficiency of the light and the second layer 154 of the parallax barrier can be made of the various material that blocks the incident light. In this invention, the first layer 152 may have reflectivity of more than about 60% and the second layer 154 may have the reflectivity of less than about 15%.

The first layer 152 of the parallax barrier may be formed in the single layer of Al alloy such as AlNd or a high reflective metal such as Mo. The first layer 152 may be formed in a plurality of layers such as AlNd/Mo. The second layer 154 may be formed in the double layers such as CrOx/CrNy or the triple layers such as CrOx/CrNy/Cr.

The first and second layers 152 and 154 of the parallax barriers can be formed in the same process as the liquid crystal display panel 101. That is, the viewing converting unit 102 can be formed in the same process line as the liquid crystal display panel 102. Thus, it is not necessary to add the additional processes for forming the viewing converting unit 102, and cost may be decreased or avoided.

The viewing converting unit 102 may be attached to the liquid crystal display panel 102 by an adhesive layer 122.

Hereinafter, the process of fabricating the viewing converting unit will be described with reference to the accompanying drawings.

FIGS. 7A-7D are views illustrating the method of fabricating the viewing converting unit of a first embodiment. The second layer 154 of parallax barrier may be made of black resin.

Figure 7A:
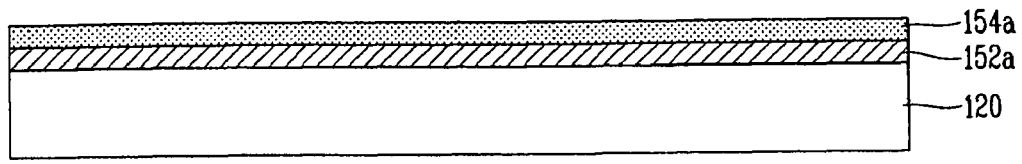
FIGS. 7A-7D are views illustrating a method of fabricating the multi-viewing display device of the first embodiment.

As illustrated in FIG. 7A, a metal layer 152a having good reflectivity is formed on the transparent substrate 120, and then an organic layer 154a is formed on the metal layer 152a. Any metal may be used for the metal layer 152a, if the metal has good reflectivity. For example, Al, the Al alloy such as AlNd, Mo, and Cu may be used. AlNd or AlNd/Mo may be used as the metal layer in the source electrode and the source/drain electrode process line, since the gate electrode and the source/drain electrode may also be formed of AlNd or AlNd/Mo. An AlNd layer may be formed with a thickness of about 100-3000 Å and a Mo layer may be formed in about 500-3000 Å. The AlNd layer may be formed in the thickness of about 500-2500 Å.

Although not shown in figure, an intermediate layer (see FIG. 6B) may be formed between the substrate 120 and the metal layer 152a. When the metal layer 152a is made of Cu, the intermediate layer 151 may be made of Mo or MoTi having the thickness of less than about 500 Å. When the metal 152a is made of CuAl, an Al alloy, and Mo, the intermediate layer 151 may be made of ITO or IZO having the thickness of less than about 1500 Å.

The organic layer 154a may be made of a black resin that is also used for the black matrix of the liquid crystal display panel 101. Thus, the organic layer 154a may be formed in the black matrix process line of the liquid crystal display panel 101. The black resin layer of the viewing converting unit may be formed in the thickness of about 0.1-5.0 μm for example, a thickness of about 0.5-3.0 μm Thereafter, as illustrated FIG. 7B, a mask 158 having transmit portion and block portion is disposed over the metal layer 152a and the organic layer 154a, and then light is irradiated to the organic layer 154a through the transmit portion of the mask to expose the organic layer 154a. The black resin may have a characteristic of negative photo-resist, so that the transmit portion of the mask 158 corresponds to the region in which the parallax barrier is formed and the block portion of the mask 158 corresponds to the region in which the parallax barrier is not formed.

Figure 7B:
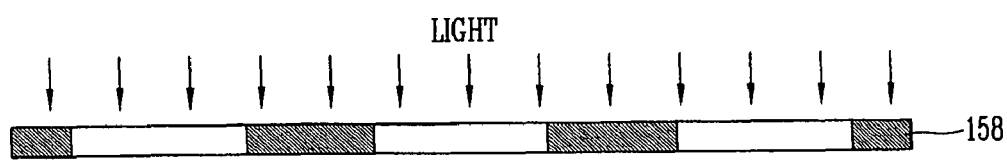
Figure 7B:
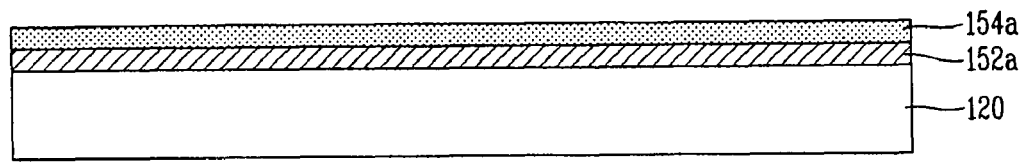
Figure 7C:
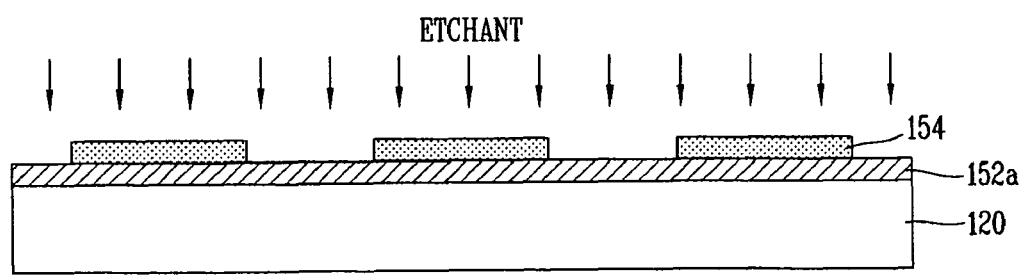

As illustrated in FIG. 7C, thereafter, when a developer is applied to the organic layer 154a, the non-exposed region of the organic layer 154a is removed and the exposed region remains, so that the second layer 154 of the parallax barriers are formed on the metal layer 152a.

Figure 7D:
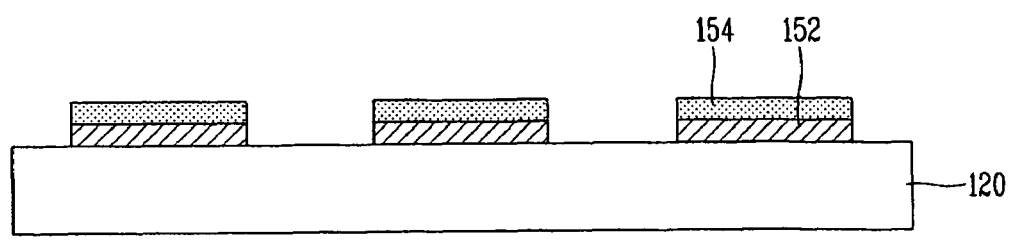

Illustrated in FIG. 7D, when the etchant is applied to the metal layer 152a on which the second layers 154 of the parallax barriers are formed, the second layers 154 of the parallax barriers act as a blocking layer so that the metal layer 152a, except the portion under the second layers 154, is etched. Thus, the first layers 152 of the parallax barriers are formed under the second layer 154. If an intermediate layer being formed between the substrate 120 and the metal layer 152a, the intermediate layer can be etched by this etching process using the etchant.

As described above, the black resin may be directly developed to form the second layers of the parallax barriers, and the metal layer may be etched using the second layers of the parallax barriers. Accordingly, a high priced photo-resist is not necessary. Therefore, the fabrication cost may be decreased, and the process may be simplified.

The viewing converting unit 102 may be attached to the rear side of the liquid crystal display panel 101 by an adhesive layer 122 to form the multi-view display device.

FIGS. 8A-8D are views illustrating another method of fabricating the viewing converting unit 102. The second layer of parallax barriers may be of a metal having low reflectivity.

Figure 8A:
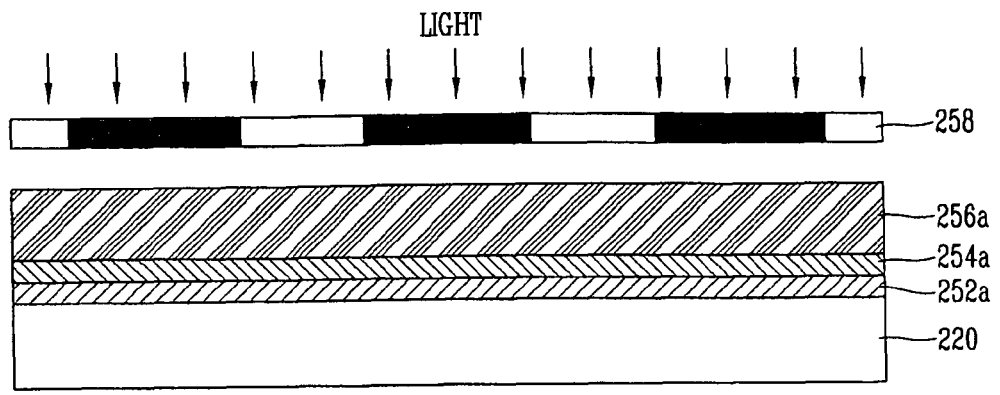
FIGS. 8A-8D are views illustrating another method of fabricating the multi-viewing display device of the first embodiment.

As illustrated in FIG. 8A, a first metal layer 252a having good reflectivity is formed on the transparent substrate 220, and then a second metal layer 254a having low reflectivity is formed on the first metal layer 152a.

The first metal layer 252a may be formed in the single layer of Al, Al alloy such as AlNd, Mo, and Cu or in the double layer of AlNd/Mo. The AlNd or AlNd/Mo may be formed in the same process as the gate electrode or the source/drain electrodes of the thin film transistor. AlNd layer may be formed in a thickness of about 100-3000 Å, and Mo layer may be formed in a thickness of about 500-3000 Å. The AlNd layer can be formed in the thickness of about 500-2500 Å.

Although not shown in figure, an intermediate layer may be formed between the substrate 120 and the metal layer 152a. When the metal layer 152a is made of Cu, the intermediate layer 151 may be made of Mo or MoTi having the thickness of less than about 500 Å. When the metal 152a is made of CuAl, an Al alloy, and Mo, the intermediate layer 151 may be made of ITO or IZO having the thickness of less than about 1500 Å.

The second metal layer 254a may be formed in a double layer of CrOx/Cr or in the triple layers of CrOx/CrNy/Cr. The CrOx layer may be formed in the thickness of about 100-3000 Å, or about 200-1000 Å, the CrNy layer may be formed in the thickness of about 100-3000 Å, or about 200-1000 Å, and the Cr layer may be formed in the thickness of about 100-3000 Å, or about 500-2500 Å. The second metal layer 254a may be the same layer as the black matrix of the liquid crystal display panel, so that the second metal layer 254a can be formed in the black matrix process line.

The Cr has a reflectivity higher than that of CrNy. Therefore, it is possible to form the CrOx layer having low reflectivity as the top layer of the second metal layer 254a and Cr layer as the bottom layer of the second metal layer 254a, for example, in contact with the first metal layer 252a.

A photoresist layer 256a may be formed on the second metal layer 254a. A mask 258 having the transmit portion and the block portion is disposed over the photoresist layer 256a, and then light, such as ultraviolet ray, is irradiated to the photoresist layer 256a to expose the photoresist layer 256a.

Since the photoresist may be a positive photoresist, the block portion of the mask 258 may correspond to the region in which the parallax barrier is formed and the transmit portion of the mask 258 may correspond to the region in which the parallax barrier is not formed.

Figure 8B:
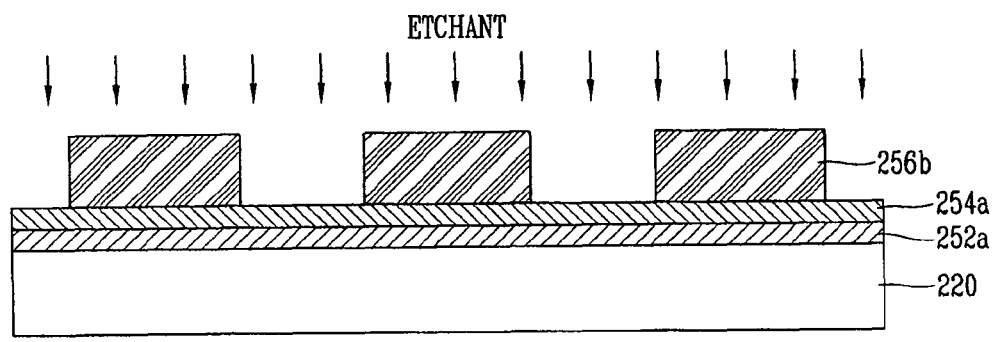
Figure 8C:
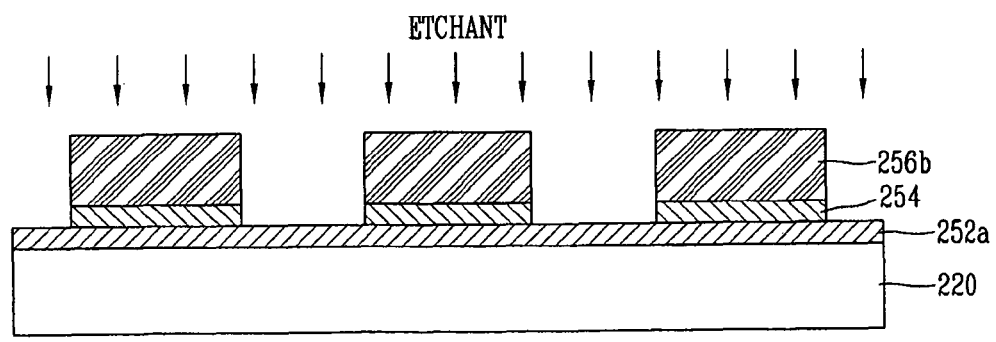
Figure 8D:
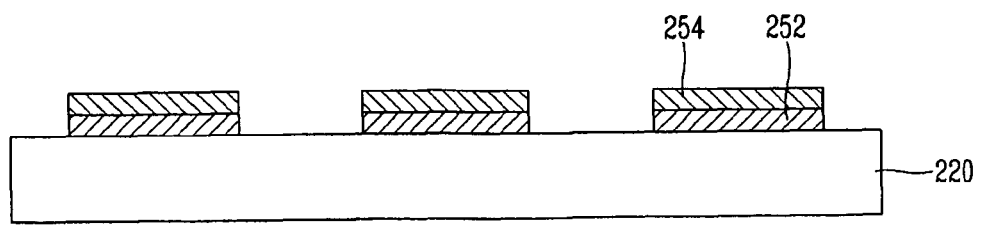

As illustrated in FIGS. 8B and 8C, thereafter, the photoresist layer 256a may be developed by the developer to form the photoresist pattern 256b on the second metal layer 254a. The second metal layer 254a and the first metal layer 252a may be etched by an etchant using the photoresist pattern 256b as the blocking layer to form the first layer 252 of parallax barriers and the second layers 254 of the parallax barriers. As illustrated in FIG. 8D, thereafter, the photoresist pattern 256b is removed.

If an intermediate layer is formed between the substrate 120 and the metal layer 152a, the intermediate layer can be etched by this etching process using the etchant.

As described above, when the second layer 254 of the parallax barrier is made of the metal having low reflectivity, the first and second layers 252 and 254 of parallax barriers may be patterned by one photoresist pattern 256b.

The first metal layer 252 and the second metal layer 254a can be etched substantially simultaneously by the same etchant or etched in the two processes by different etchants in accordance with the kind of the metal and the etchant.

The parallax barrier may include a high reflective layer and the low reflective layer. Accordingly, the light incident from the back light is reflected by the high reflective layer and re-reflected by the reflecting plate of the back light so that the re-reflected light is supplied to the liquid crystal display panel. Further, the light reflected by the liquid crystal display panel is not reflected by the low reflective layer and thus cross talk is reduced.

Further, since the parallax barrier can be formed in the same process line as that of the liquid crystal display panel, an additional process line is not necessary, and thus the cost may be reduced.

Figure 9:
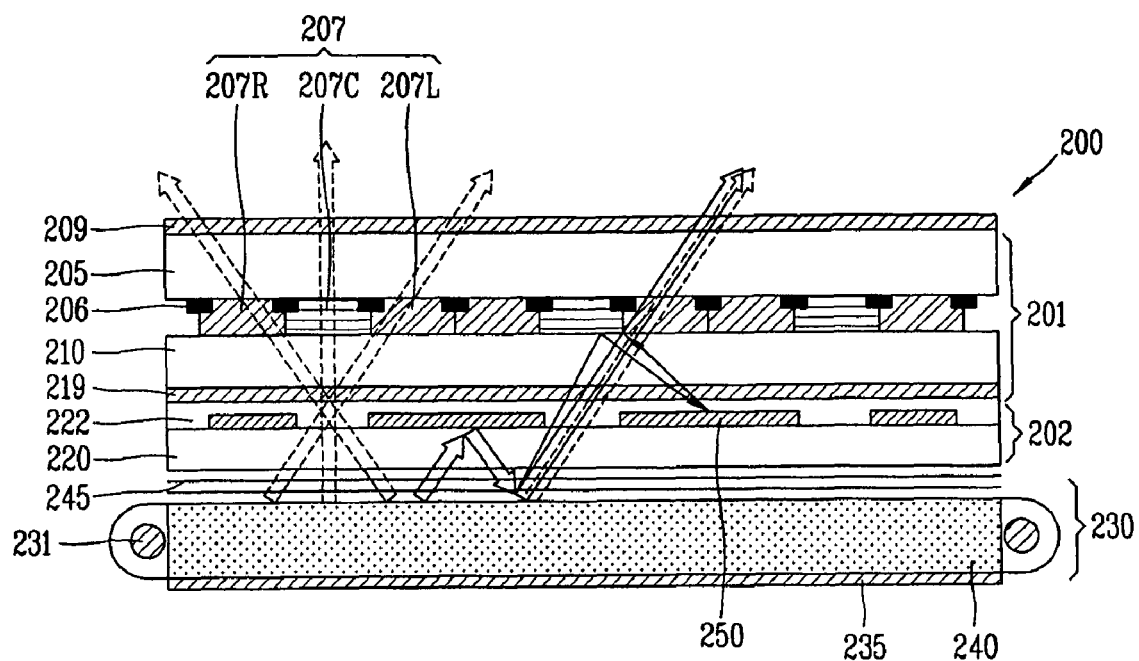
FIG. 9 is a view illustrating the structure of the multi-viewing display device according to the second embodiment of this invention.

FIG. 9 is view illustrating the multi-view display device according to second embodiment of this invention. In this drawing, only the 3-view display device in which the different images are displayed in three different viewing directions is described.

As illustrated in FIG. 9, this multi-view display device includes a liquid crystal display panel 201, a back light 230 at the rear side of the liquid crystal display panel 201 to supply the light thereto, a viewing converting unit 202 between the liquid crystal display panel 201 and the back light 230. The viewing converting unit 202 may form a plurality of paths for light from the back light 230 to the liquid crystal display panel 201.

As illustrated in FIG. 5, the liquid crystal display panel 201 includes an array substrate 210 having a plurality of thin film transistors, a color filter substrate 205 having the color filter, and a liquid crystal layer between the array substrate 210 and the color filter substrate 205.

As illustrated in FIG. 9, the color filter 207 includes a first color filter 207C for the center view, a second color filter 207L for the left view, and the third color filter 207R for the right view.

The array substrate 210 and the color filter substrate 205 are attached by a sealant (not shown) at the outer edge of the image display region to form the liquid crystal display panel 201. Linear polarizing plates 209 and 219 are respectively disposed at the outside of the array substrate 210 and the color filter substrate 205. Further, the linear polarizing plate 219 may be disposed between the viewing converting unit 202 and the back light 230

The viewing converting unit 202 may be disposed at the rear side of the liquid crystal display panel 201. The viewing converting unit 202 divides the path of the light into a plurality of paths, and then supplies the light to the liquid crystal display panel 201 through the divided paths, so that a plurality of images in the liquid crystal display panel 201 are displayed through the divided paths, and users can watch the different image, in accordance with the position of the user. A plurality of parallax barriers 250 are formed in the viewing converting unit 202 to divide the path of the light to be supplied to the liquid crystal display panel 201 into a plurality of paths.

Figure 10:
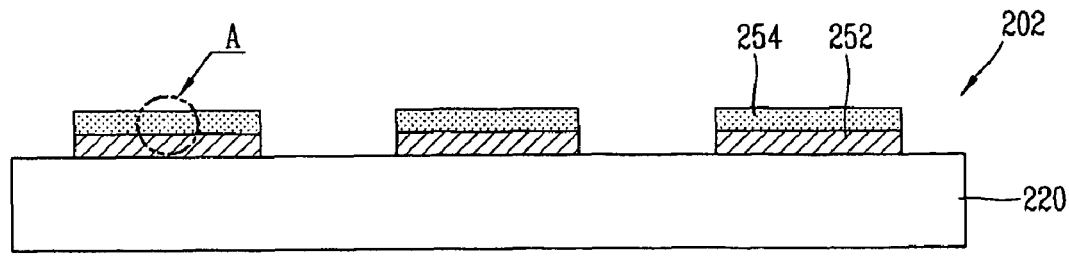
FIG. 10 is a view illustrating the structure of the viewing converting unit of the second embodiment.

As illustrated in FIG. 10, the viewing converting unit 202 includes a substrate 220, parallax barriers on the substrate 220, and the parallax barriers include a first layer 252 and a second layer 254 on the first layer 252. The viewing converting unit 202 transmits part of the light from the back light 230 and blocks part of the light to divide the path of the light to the liquid crystal display panel 201 into a plurality of the paths. The first layer 252 of the parallax barrier may be made of high reflective material, for example, Al, an Al alloy such as AlNd, Mo, Cu, to reflect the light from the back light 130, and the second layer 254 of the parallax barrier may be made of a retroreflection material to reflect the light from the liquid crystal display panel 201 through the same path as the light incident to the liquid crystal display panel 201.

Although not shown in figure, an intermediate layer may be formed between the substrate 220 and the first parallax barrier 252 to attach the first layer 252 of the parallax barrier to the substrate 220. When the first layer of the parallax barrier is made of Cu, the intermediate layer 251 may be made of Mo or MoTi having a thickness of less than about 500 Å. When the first layer of the parallax barrier is made of Al, Al alloy, or Mo, the intermediate layer 251 may made of ITO or IZO having the thickness of less than about 1500 Å.

The viewing converting unit 202 is divided into a transmit portion and a block portion by the first and second parallax barriers 252 and 254, so that a part of the light passes through the transmit portion and a part of the light is blocked by the block portion, thereby the path of the light is divided into a plurality of paths. The width of the transmit portion and the block portion, that is, the width of the parallax barriers 250 and the interval between the parallax barriers 250 may be determined by the interval between the viewing converting unit 202 and the liquid crystal display panel 201, the viewing angle to the multi-view, and the number of the multi-view directions.

The back light 230 is disposed at the rear side of the viewing converting unit 202. The back light 230 includes a plurality of lamps 231 for emitting the light, a light guide plate 240 at the rear side of the viewing converting unit 202 to guide the light from the lamps 231 to the liquid crystal display panel 201, a plurality of optical sheets 245 between the viewing converting unit 202 and the light guide plate 240 to scatter the light guided by the light guide plate 240 for supplying the uniform light to the liquid crystal display panel 201, and a reflecting plate 235 at the rear side of the light guide plate 240 to reflect the light to the liquid crystal display panel 201.

The parallax barriers 250 of the viewing converting unit 202 divide the path of the light into a plurality of paths, and the light is supplied to the liquid crystal display panel 201 through the divided several paths. Thus, images are also displayed through a plurality of paths in the liquid crystal display panel 201. That is, a plurality of images are simultaneously displayed in the determined regions so that a plurality of users can watch the desired images simultaneously.

The first parallax barrier 252 of the viewing converting unit 202 is made of the metal having good reflectivity. Thus, the light incident to the first parallax barrier 252 from the back light 230 is reflected by the first parallax barrier 252. Then, the reflected light is again reflected at the reflecting plate 235 of the back light 230 and then supplied to the liquid crystal display panel 201 through the transmit portion of the viewing converting unit 202. At this time, the reflected light at the parallax barrier 250 is supplied to the liquid crystal display panel 201 through above process, so that the brightness of liquid crystal display device can be improved.

As illustrated in FIG. 10, the second layer 254 of parallax barrier on the first layer 152 of parallax barrier 252 may be made of the retroreflection material.

Various metal patterns such as the gate line 216 and the data line 217 are formed in the liquid crystal display panel 201. Thus, when the light is supplied to the liquid crystal display panel 201 through the viewing converting unit 202, the light is reflected at the metal patterns of the liquid crystal display panel 201 and then again incident to the viewing converting unit 202. If the first and second layers 252 and 254 of the parallax barriers are made of the metal having good reflectivity, the light incident to the viewing converting unit 202 is reflected at the first and second layers of the parallax barriers and then supplied to the liquid crystal display panel 201.

The light reflected from the first and second layers 252 and 254 of the parallax barriers does not propagate along a set path. Further, the light reflected from the first and second layers 252 and 254 is not supplied to a set pixel. Thus, the light may act as a noise and cross talk may occur in the liquid crystal display panel 201.

However, since the upper layer of the parallax barriers may be made of a retroreflective material, the light reflected from the parallax barrier may propagate along an incidence path and be supplied to a set pixel, so that the brightness of the liquid crystal display device may be improved.

Figure 11A:
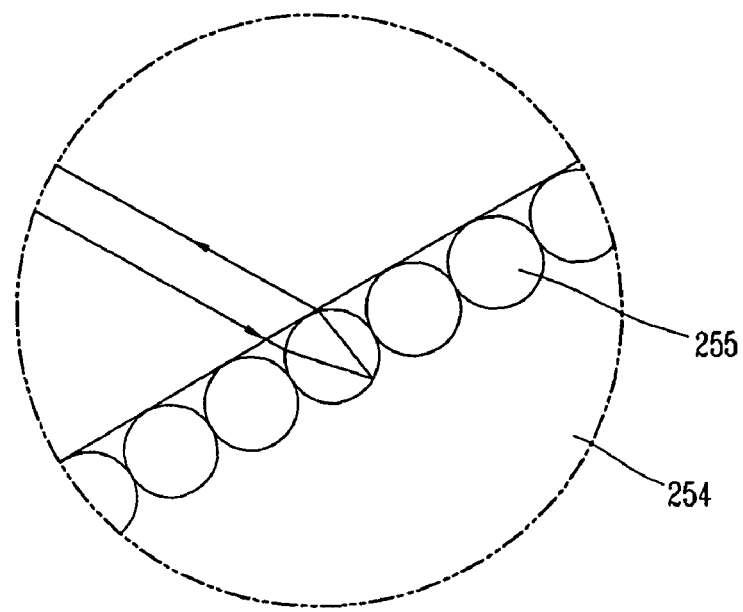
FIGS. 11A and 11B are views illustrating the structure of the retroreflection material of the second embodiment.
Figure 11B:
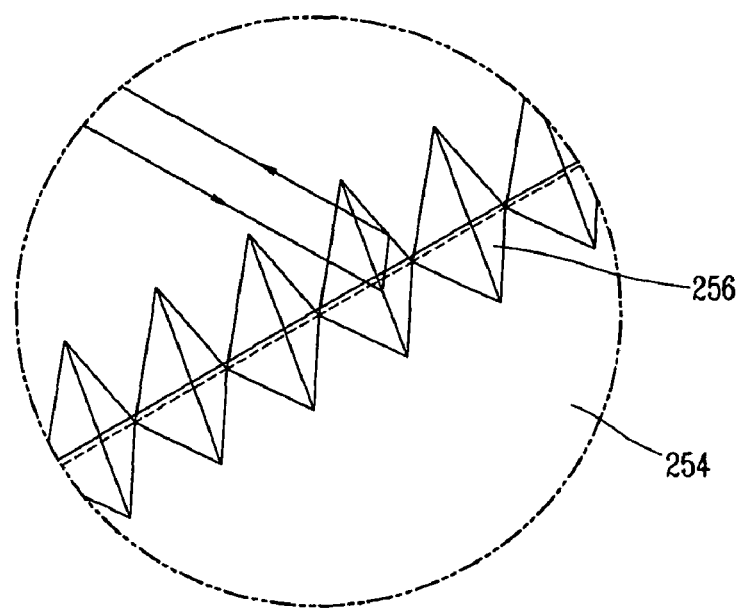

FIGS. 11A and 11B are the enlarged view of a retroreflection material of region A of FIG. 10.

As illustrated in FIG. 11A, glass spheres 255 may be formed at the surface of the second parallax barrier 254. Further, the glass spheres 255 may be formed on the whole area of the surface of the second layer 254. Thus, some of the light incident to the second layer 254 may enter the glass spheres 255. For example, light incident to the glass sphere 255 may be refracted at the surface of the glass sphere 255, so that light can be perpendicularly incident to the opposite surface of the glass sphere 255. The light incident that is perpendicularly incident to the surface of the glass sphere 255 is reflected at this surface and then refracted at the opposite surface of the glass sphere 255 to be outputted to the liquid crystal display panel 201. If the glass sphere 255 is a perfect sphere, the glass sphere 255 is isotropic. Thus, the light incident to the whole surface of the glass sphere 255 would be refracted in the same angle at the whole surface of the glass sphere 255 and then incident to the opposite surface. The light incident to the opposite surface of the glass sphere 255 would also be reflected at this surface and then again refracted at the surface where the light is first incident to the glass sphere 255 in the same angle as the original incident angle. Thus, the light is supplied to the liquid crystal display panel 201 along the path parallel to the incident path.

As illustrated in FIG. 7B, a plurality of micro-prisms 256 can be formed at the surface of the parallax barrier 254. For example, the micro-prisms 252 may have a substantially regular tetrahedron shape or triangle shape. Further, the micro-prisms 256 may be formed on the whole area of the surface of the parallax barrier 254, so that light incident to the parallax barrier 254 may enter to the micro-prisms 256. The light incident to the first plane of the micro-prisms 256 may be refracted at the surface of the first plane, and then incident to the second plane of the micro-prisms 256. The light incident to the second plane may be reflected thereon and then incident to the third plane. The light incident to the third plane may be refracted at the third plane and supplied to the liquid crystal display panel 201. The input angle and the output angle at the second plane and the refractive angle of the third plane may be the same as the refractive angle at the first plane. Accordingly, the light from the third plane may be parallel to the light incident to the first plane.

The micro-prisms 256 may be grooves formed on the surface of the parallax barrier 254. The parallax barrier 254 may be formed of a resin. The micro-prisms 256 may be formed by etching the resin layer and depositing a metal layer having good reflectivity on the resin layer. Further, the micro-prisms 256 may be made of a metal having good reflectivity. The metal layer may be etched to form grooves, such as a substantially regular tetrahedron or a substantially regular triangle.

As described above, the second layer 254 parallax barrier 250 may be made of a retroflective material to retroreflect the light reflected at the liquid crystal display panel 201 to the liquid crystal display panel 201. The light reflected at the liquid crystal display panel 201 may be substantially parallel to the light re-incident to the liquid crystal display panel 201. The light may be supplied to the original position, that is, original pixel. As a result, the inferiority caused by the light incidence can be reduced.

Since the first layer 252 of the parallax barrier may be made of metal having good reflectivity and the second layer 254 of the parallax barrier may be made of a retroreflective material, the light is sufficiently supplied to the liquid crystal display panel 201 so that the brightness of the liquid crystal display panel can be improved. Further, the light reflected from the liquid crystal display panel 201 may not be supplied to an undesired pixel, so that the cross talk can be reduced.

In the description of the invention, only the liquid crystal display panel is disclosed. However, this invention is not limited to the particular display device. For example, PDP or organic light emitting diode may be adapted to this invention. Further, in the drawing and the description, only the twisted nematic mode liquid crystal display panel is described, but the various mode liquid crystal display panels, such as in-plane switching mode or vertical alignment mode, can be used. Further, this invention is not limited to the particular material of the parallax barrier.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A multi-view display device, comprising:
   a display panel for displaying images;
   a back light unit for supplying the light to the display panel; and
   a viewing converting unit between the display panel and the back light unit to control the path of the light to the display panel from the back light, the viewing converting unit including:
      a substrate;
      at least one parallax barrier on the substrate, the parallax barrier including a reflective layer for reflecting the light incident from the back light unit to the back light unit and a light-blocking layer above the reflective layer for blocking the light reflected from the display panel.

2. The device according to claim 1, wherein the display panel includes a liquid crystal display panel, a plasma display panel, and an organic light emitting display panel.

3. The device according to claim 1, wherein the parallax barrier further includes an intermediate layer between the reflective layer and the light blocking layer.

4. The device according to claim 1, wherein the parallax barrier further includes an adhesion layer under the reflective layer.

5. The device according to claim 1, wherein the display panel is a liquid crystal display panel including:
   a color filter substrate having a plurality of sub-color to display a plurality of images at the viewing direction;
   an array substrate having a plurality of thin film transistors; and
   a liquid crystal layer between the color substrate and the array substrate.

6. The device according to claim 1, wherein the reflective layer is made of material having reflectivity of more than about 60%.

7. The device according to claim 1, wherein the reflective layer includes a metal selected from the group consisting of Al, Al alloy, and Mo.

8. The device according to claim 1, wherein the reflective layer includes AlNd.

9. The device according to claim 8, wherein the thickness of the AlNd is approximately 500-3000 Å.

10. The device according to claim 3, wherein the reflective layer includes AlNd and the intermediate layer includes Mo.

11. The device according to claim 10, wherein the thickness of AlNd is approximately 500-3000 Å and the thickness of Mo is approximately 500-3000 Å.

12. The device according to claim 1, wherein the reflective layer includes Cu.

13. The device according to claim 12, wherein the thickness of the Cu is approximately 500-3000 Å.

14. The device according to claim 12, further including an adhesion layer between the reflective layer and the substrate, wherein the adhesion layer includes one of Mo and MoTi.

15. The device according to claim 4, wherein the reflective layer includes one of CuAl, Al Alloy and Mo, and the adhesion layer includes one of ITO and IZO.

16. The device according to claim 1, wherein the light blocking layer has a reflectivity of less than about 15%.

17. The device according to claim 16, wherein the light blocking layer is made of organic material.

18. The device according to claim 1, wherein the light blocking layer is made of the black resin.

19. The device according to claim 18, wherein the thickness of black resin is approximately 0.5-3 μm.

20. The device according to claim 1, wherein the light blocking layer includes CrOx layer.

21. The device according to claim 20, wherein the thickness of the CrOx layer is approximately 200-1000 Å.

22. The device according to claim 1, wherein the light blocking layer includes a CrOx layer and a CrNy layer.

23. The device according to claim 22, wherein the thickness of the CrOx layer is approximately 200-1000 Å and the thickness of the CrNy layer is approximately 200-1000 Å.

24. The device according to claim 1, wherein the light blocking layer includes a CrOx layer and a CrNy layer over a Cr layer.

25. The device according to claim 22, wherein the thickness of the CrOx layer is approximately 200-1000 Å, the thickness of the CrNy layer is approximately 200-1000 Å and the thickness of the Cr layer is approximately 500-3000 Å.

26. The device according to claim 1, further comprising a reflecting surface in the back light to re-reflect the light reflected by the parallax barrier to the display panel.

27. A multi-view display device, comprising:
   a display panel for displaying images;
   a back light unit for supplying the light to the display panel; and
   a viewing converting unit between the display panel and the back light unit to control the path of the light to the display panel from the back light, the viewing converting unit including:
      a substrate;
      at least one parallax barrier on the substrate, the parallax barrier including a reflective layer for reflecting the light incident from the back light unit to the back light unit and a retro-reflecting layer above the reflective layer for retro-reflecting the light reflected from the display panel to the display panel.

28. A method of fabricating a multi-view display device, comprising:
  providing a back light unit;
  providing a liquid crystal display panel, the liquid crystal display panel including a thin film transistor substrate having a plurality of thin film transistors and a color filter substrate having a color filter layer, the thin film transistor substrate being facing the back light unit so that the light from the back light unit is incident to the liquid crystal display panel through the thin film transistor substrate;
  providing a substrate;
  forming a layer of reflective material on the substrate;
  forming a layer of light blocking material on the metal layer;
  patterning the layer of light blocking material to form a plurality of light blocking regions;
  patterning the layer of reflective material to form a plurality of reflective regions under respective ones of the light blocking regions to form a plurality parallax barriers on the substrate; and
  attaching the substrate having the parallax barriers to the thin film transistor substrate of the liquid crystal display panel.

29. The method of claim 28, wherein the light blocking material is a black resin and the plurality of light blocking regions are used as a mask for etching the layer of reflective material.

30. The method of claim 28, wherein the light blocking material is a metal, and wherein said patterning steps include:
  applying a photoresist over the light blocking layer;
  patterning the photoresist;
  developing the photoresist; and
  etching the light blocking layer to form the at least one light blocking region.

31. The method of claim 30, wherein the reflective material is patterning in the same process as the light blocking layer to form the at least one reflective region under the at least one light blocking region.

* * * * *